(12) United States Patent
Cheng et al.

(10) Patent No.: US 10,929,722 B2
(45) Date of Patent: *Feb. 23, 2021

(54) ANOMALY DETECTION IN STREAMING NETWORKS

(71) Applicant: NEC Laboratories America, Inc., Princeton, NJ (US)

(72) Inventors: Wei Cheng, Princeton Junction, NJ (US); Haifeng Chen, West Windsor, NJ (US); Kenji Yoshihira, Princeton Junction, NJ (US)

(73) Assignee: NEC CORPORATION

( * ) Notice: Subject to any disclaimer, the term of this patent is extended or adjusted under 35 U.S.C. 154(b) by 454 days.

This patent is subject to a terminal disclaimer.

(21) Appl. No.: 15/981,087

(22) Filed: May 16, 2018

(65) Prior Publication Data

US 2018/0336436 A1 Nov. 22, 2018

Related U.S. Application Data

(60) Provisional application No. 62/508,408, filed on May 19, 2017.

(51) Int. Cl.
*G06K 9/62* (2006.01)
*G06K 9/00* (2006.01)
*G06F 16/901* (2019.01)

(52) U.S. Cl.
CPC ....... *G06K 9/6272* (2013.01); *G06F 16/9024* (2019.01); *G06K 9/00523* (2013.01); *G06K 9/00536* (2013.01); *G06K 9/6284* (2013.01)

(58) Field of Classification Search
None
See application file for complete search history.

(56) References Cited

U.S. PATENT DOCUMENTS 10,496,884 B1 * 12/2019 Nguyen ............... G06N 3/0454
10,499,857 B1 * 12/2019 Nguyen ............... A61B 5/7267
(Continued)

FOREIGN PATENT DOCUMENTS

CN 105386175 * 10/2017 ............. D01H 13/32
WO WO 2016182156 * 11/2016 ............... A61B 5/16
(Continued)

OTHER PUBLICATIONS

Riyaz Ahamed Ariyaluran Habeeb, Clustering based real-time anomaly detection, 22 pages, printed Oct. 20, 2020 (Year: 2020).*

(Continued)

*Primary Examiner* — Tung S Lau
(74) *Attorney, Agent, or Firm* — Joseph Kolodka

(57) ABSTRACT

A computer-implemented method, system, and computer program product are provided for anomaly detection system in streaming networks. The method includes receiving, by a processor, a plurality of vertices and edges from a streaming graph. The method also includes generating, by the processor, graph codes for the plurality of vertices and edges. The method additionally includes determining, by the processor, edge codes in real-time responsive to the graph codes. The method further includes identifying, by the processor, an anomaly based on a distance between edge codes and all current cluster centers. The method also includes controlling an operation of a processor-based machine to change a state of the processor-based machine, responsive to the anomaly.

20 Claims, 9 Drawing Sheets

(56) References Cited

U.S. PATENT DOCUMENTS

| | | | |
|---|---|---|---|
| 10,692,602 B1* | 6/2020 | Nguyen | G06T 7/11 |
| 2009/0136093 A1* | 5/2009 | Hartlove | G06F 19/3418 |
| | | | 382/110 |
| 2014/0099000 A1* | 4/2014 | Shamir | G06T 3/00 |
| | | | 382/110 |
| 2016/0352603 A1* | 12/2016 | VanAntwerp | H04L 65/605 |
| 2017/0063906 A1* | 3/2017 | Muddu | G06N 5/04 |
| 2017/0279694 A1* | 9/2017 | Sartran | H04L 43/045 |
| 2018/0336437 A1* | 11/2018 | Cheng | G06K 9/00536 |
| 2019/0125249 A1* | 5/2019 | Rattner | A61B 5/443 |
| 2019/0317728 A1* | 10/2019 | Chen | G06F 16/2379 |
| 2020/0076840 A1* | 3/2020 | Peinador | G06F 16/80 |
| 2020/0076841 A1* | 3/2020 | Hajimirsadeghi | H04L 41/16 |
| 2020/0076842 A1* | 3/2020 | Zhou | G06N 3/0454 |

FOREIGN PATENT DOCUMENTS

| | | | | |
|---|---|---|---|---|
| WO | WO 2018106783 | * | 6/2018 | G06T 7/11 |
| WO | WO 2018170401 | * | 9/2018 | G06K 9/6284 |
| WO | WO 2008130905 | * | 10/2018 | G06K 9/00 |

OTHER PUBLICATIONS

Ajay Sreenivasulu, Evaluation of Cluster Based Anomaly Detection, 28 pages, 2019 (Year: 2019).*

Imtiaz Ahmed, Unsupervised Anomaly Detection Based on Minimum Spanning Tree Approximated Distance Measures and Its Application to Hydropower Turbines, 2018 IEEE, 14 pages (Year: 2018).*

P. Kola Sujatha, Network Level Anomaly Detection System Using MST Based Genetic Clustering, © Springer-Verlag Berlin Heidelberg 2011, pp. 113-122, 2011 (Year: 2011).*

PCT report, 3 pages, PCT/US2018/033149 (Year: 2018).*

Huaming Huang (Rank Based Anomaly Detection Algorithms, 2013, 182 pages) (Year: 2018).*

Xing Wang (Exact variable-length anomaly detection algorithm for univariate and multivariate time series, 39 pages, 2018) (Year: 2018).*

Bengio, "A Neural Probabilistic Language Model", The Journal of Machine Learning Research, Feb. 2003, pp. 1137-1155.

Levy, "Neural Word Embedding as Implicit Matrix Factorization" Advances in Neural Information Processing Systems, Dec. 2014, pp. 2177-2185.

Mikolov, "Efficient Estimation of Word Representations in Vector Space", arXiv preprint arXiv:1301.3781, Sep. 2013, pp. 1-12.

Mikolov, "Distributed Representations of Words and Phrases and their Compositionality", Advances in Neural Information Processing Systems, Dec. 2013, pp. 3111-3119.

Manzoor, "Fast Memory Efficient Anomaly Detection in Streaming Heterogeneous Graphs", Proceedings of the 22nd ACM SIGKDD International Conference on Knowledge Discovery and Data Mining, Aug. 2016, pp. 1035-1044.

Ranshous, "A Scalable Approach for Outlier Detection in Edge Streams Using Sketch-Based Approximations", Proceedings of the 2016 SIAM International Conference on Data Mining, May 2016, pp. 189-197.

Indyk, "Approximate Nearest Neighbors: Towards Removing the Curse of Dimensionality", Proceedings of the Thirtieth Annual ACM Symposium on Theory of Computing, 1998, pp. 604-613.

Cormode, "An Improved Data Stream Summary: the Count-Min Sketch and its Applications", Journal of Algorithms, Apr. 2005, pp. 58-75.

Cheng, "Ranking Causal Anomalies via Temporal and Dynamical Analysis on Vanishing Correlations", KDD, Aug. 2016, pp. 805-814.

* cited by examiner

ANOMALY DETECTION IN STREAMING NETWORKS

RELATED APPLICATION INFORMATION

This application claims priority to U.S. Provisional Patent Application Ser. No. 62/508,408 filed on May 19, 2017, incorporated herein by reference herein its entirety. Moreover, this application is related to commonly assigned U.S. patent application Ser. No. 15/981,109, filed concurrently herewith and incorporated herein by reference.

BACKGROUND

Technical Field

The present invention relates to streaming graphs and more particularly anomaly detection in streaming networks.

Description of the Related Art

Graph embedding with a neural network technique is a natural method to represent the evolutionary structure of networks as vector representations because of its ability to leverage the structural correlations among the edges and vertices in the network. The streaming nature of this problem is challenging because of the high rate of the incoming stream, and the need to perform fast real-time detection with bounded memory usage.

SUMMARY

According to an aspect of the present principles, a computer-implemented anomaly detection method performed in streaming networks is provided. The method includes receiving, by a processor, a plurality of vertices and edges from a streaming graph. The method also includes generating, by the processor, graph codes for the plurality of vertices and edges. The method additionally includes determining, by the processor, edge codes in real-time responsive to the graph codes. The method further includes identifying, by the processor, an anomaly based on a distance between edge codes and all current cluster centers. The method also includes controlling an operation of a processor-based machine to change a state of the processor-based machine, responsive to the anomaly.

According to another aspect of the present principles, a computer program product is provided for demand charge management. The computer program product comprising a non-transitory computer readable storage medium having program instructions. The program instructions executable by a computer to cause the computer to perform a method. The method includes receiving, by a processor, a plurality of vertices and edges from a streaming graph. The method also includes generating, by the processor, graph codes for the plurality of vertices and edges. The method additionally includes determining, by the processor, edge codes in real-time responsive to the graph codes. The method further includes identifying, by the processor, an anomaly based on a distance between edge codes and all current cluster centers. The method also includes controlling an operation of a processor-based machine to change a state of the processor-based machine, responsive to the anomaly.

According to another aspect of the present principles, an anomaly detection system for streaming networks is provided. The anomaly detection system includes a processing system having a processor and memory coupled to the processor. The processing system programmed to receive a plurality of vertices and edges from a streaming graph. The processing system is also programmed to generate graph codes for the plurality of vertices and edges. The processing system is additionally programmed to determine edge codes in real-time responsive to the graph codes. The processing system is further programmed to identify an anomaly based on a distance between edge codes and all current cluster centers. The processing system is also programmed to control an operation of a processor-based machine to change a state of the processor-based machine, responsive to the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
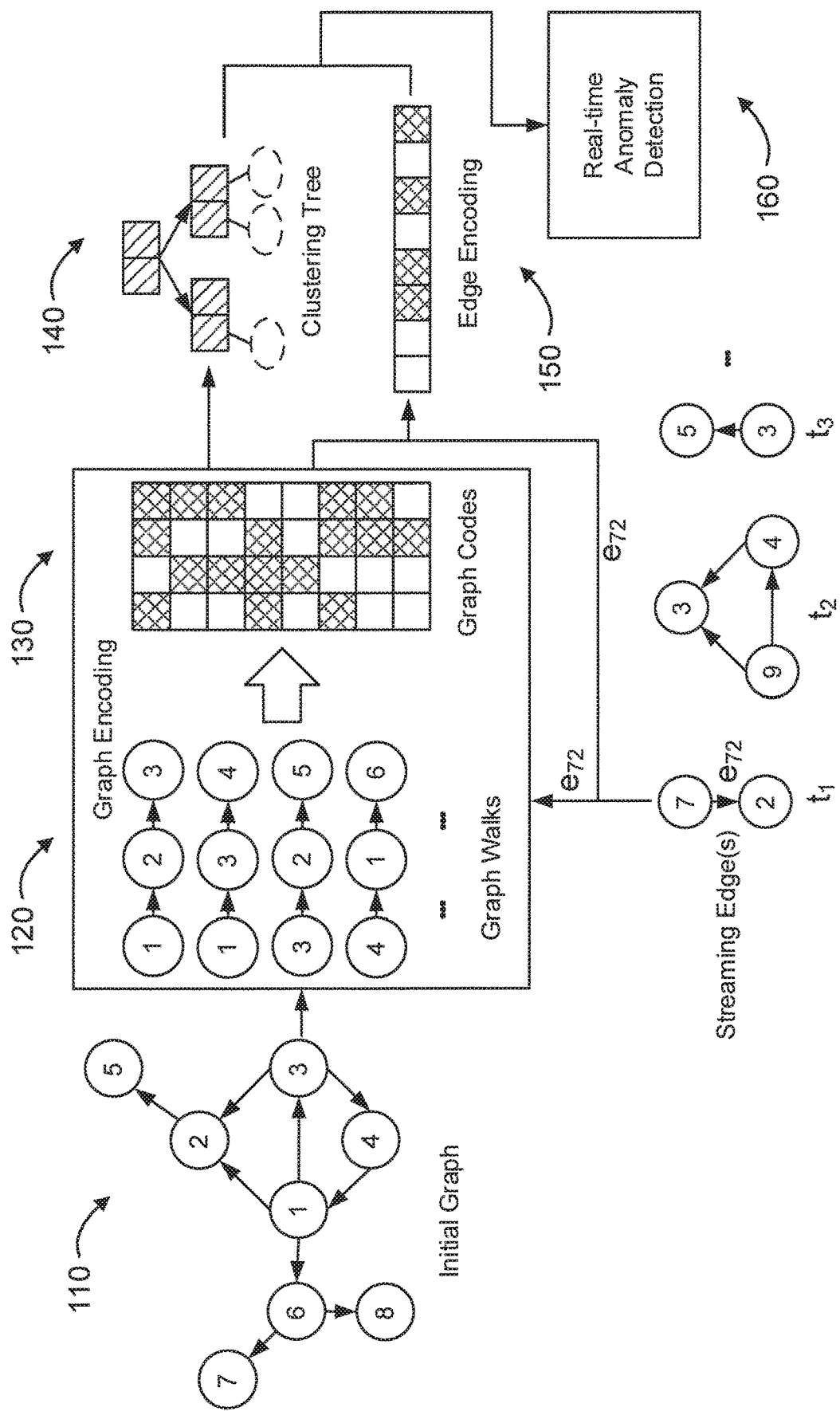
FIG. 1 is a block/flow diagram illustrating an example of an anomaly detection workflow in graph streams, in accordance with an embodiment of the present invention.

Massive streaming graphs arise in many areas such as public health, security and social media. Given the graph streams, it is useful to detect structural anomalous objects such as vertices and edges which are distant from other objects in the underlying network in real-time. The problem of detecting the graph anomalies (edges or vertices) that are significantly different from the underlying graph streams that has been observed so far is described. Such anomalies represent deviations from "normal" structural patterns in the graph streams. A framework employed for anomaly detection in graph streams by learning graph representations which can be updated incrementally as new edge(s) arrive is described.

In public health domains, anomaly detection can work with patient records. The data can include records which may have several different types of entities (vertices) such as patients, symptoms and treatments which can be modeled as a multipartite graph that represents the relationship among these entities. The graph can have anomalies due to several reasons such as abnormal patient condition and recording errors.

The advanced persistent threat (APT) detection problem in security can also be cast as real-time anomaly detection in graph streams. In APT scenario, a stream of system logs are given that can be used to construct information flow graphs. And the information flow induced by malicious activities are sufficiently different from the normal behavior of the system.

With the popularity of social media, anomalous behaviors arise based on the underlying social networks. The malicious activities such as cyber bullying, terrorist attack planning and fraud information dissemination can be detected as anomalies using graph anomaly detection models.

Graph embedding with neural network technique is a natural method to represent the evolutionary structure of networks as vector representations because of its ability to leverage the structural correlations among the edges and vertices in the network. This opens the possibility of using clustering-based algorithms for anomaly detection in graph streams. In general, graph anomalies in the multidimensional space may be represented far away from the "normal" graph clusters, which can be detected by dynamic clustering algorithms as graph objects are received over time. The streaming nature of this problem is challenging because of the high rate of the incoming stream, and fast real-time detection must be performed bounded by memory usage.

A clustering based anomaly detection method can include one or more of several two procedures, e.g., graph sketching and anomaly detection based on the sketches. The sketches can be learned by hashing such as locality-sensitive hashing and Count-Min sketch. The graph sketches or representations allow efficient updates as new graph objects arrive in the stream without maintaining the full graph structure. Existing anomaly detection approaches are not, at least directly, designed to learn the graph sketches by preserving the neighborhood information extracted from vertices.

The anomaly detection problem in graph streams can be addressed by introducing a new clustering based approach that 1) can incrementally update graph representations as new edges arriving, 2) dynamically maintains the clusters, and 3) detects anomalies in graph streams in real-time. Referring now in detail to the figures in which like numerals represent the same or similar elements and initially to FIG. 1, a block/flow diagram illustrating an example of an anomaly detection workflow in graph streams. The graph codes 130 are learned from the graph walks 120 extracted from the initial graph 110. The graph walks 120 are generated based on the consideration of the first-order and second-order proximities which can better preserve the local and global structure of the graph 110. Then a clustering tree 140 is built based on the vertices or edges codes 150. A clustering based approach is employed to score and flag anomalous vertices or edges 160. The effectiveness and efficiency of the proposed framework on read world datasets is quantitatively validated.

Figure 2:
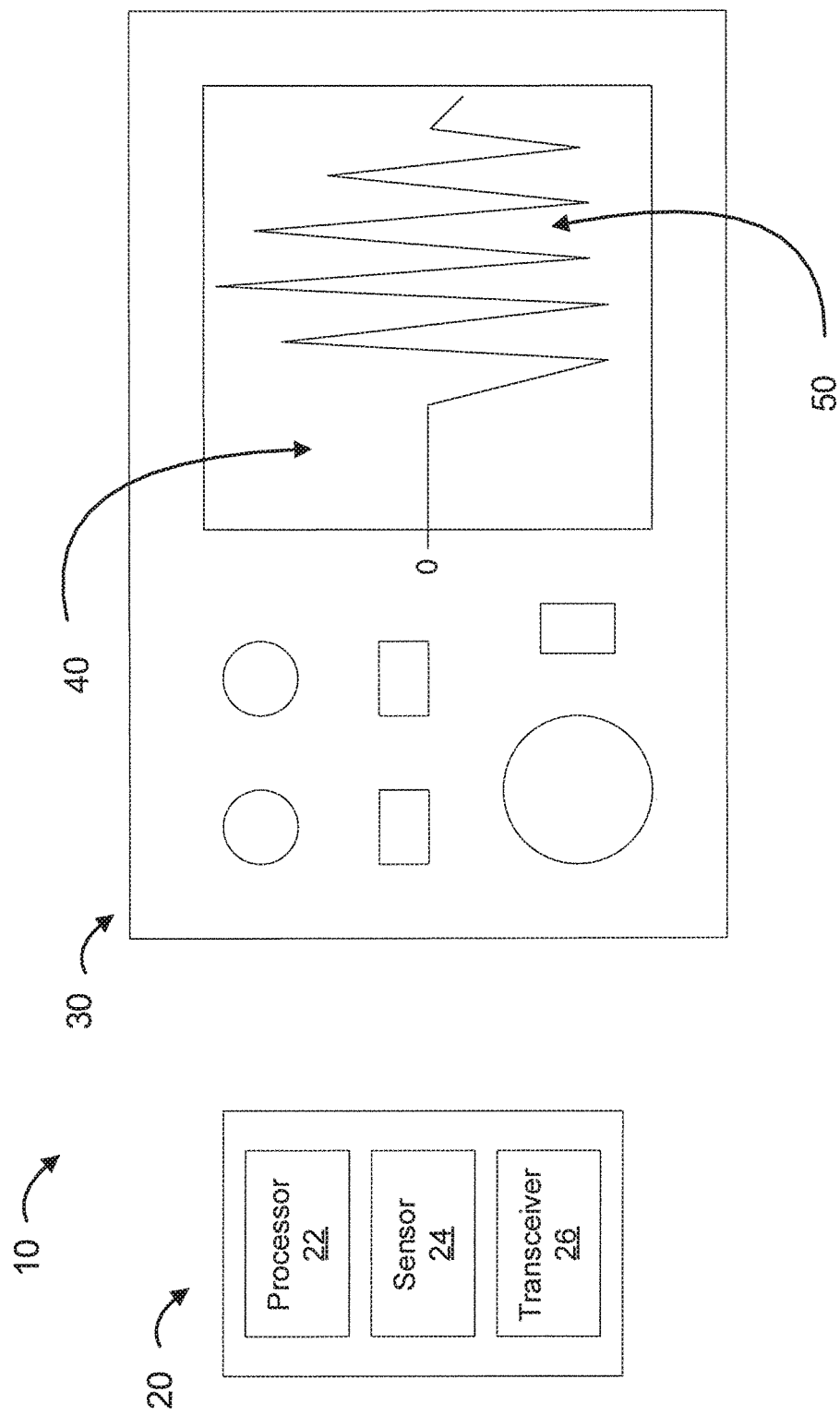
FIG. 2 is a block diagram of an exemplary environment to which the present invention can be applied, in accordance with an embodiment of the present invention.

FIG. 2 shows a block diagram of an exemplary environment 10 to which the present invention can be applied, in accordance with an embodiment of the present invention. The environment 10 is representative of a streaming graph network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 10 includes at least one sensor system or device 20 and at least one display system 30. For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The at least one sensor system or device 20 and at least one display system 30 can be part of a computer processing system, which can be any type of computer processing system including, but not limited to, servers, desktops, laptops, tablets, smart phones, media playback devices, and so forth, depending upon the particular implementation.

The at least one sensor system or device 20 can include one or more processors 22 (hereinafter "processor"), one or more sensors 24 (hereinafter "sensor"), and a transceiver 26. The processor 22 can correlate, process, or modify data from the sensor 24. In an embodiment, the sensor 24 may include one or more of the following: an optical sensor; an infrared (IR) sensor; a camera; an accelerometer or other motion sensor; an electrochemical gas sensor or other gas sensor; a thermocouple; a thermistor; a resistance thermometer; a silicon bandgap temperature sensor or other temperature sensor; and/or other sensing devices. The sensor 24 can provide a stream of data to the processor 22 which can be used to for a streaming graph. This streaming graph can move and change as the environment the sensor 24 is measuring changes.

The at least one sensor system or device 20 can send the data for the streaming graph to the at least one display system 30 with the transceiver 26. In one embodiment, the transceiver 26 may be coupled to a global position system (GPS) to determine a position of the at least one sensor system or device 20 relative to other at least one sensor system or device 20 on a common coordinate system. The transceiver 26 may be equipped to communicate with a cellular network system. In this way, at least one sensor system or device 20 can communicate with anything that is connected to the cellular network, such as, e.g., but not limited to, the Internet. In one embodiment, the cellular network system may be the communication link between at least one sensor system or device 20. In another embodiment, the cellular network system may be the communication link between the at least one sensor system or device 20 and the at least one display system 30. The transceiver 26 may include a WIFI or other radio system, a local area network, a wide area network, and so forth.

The at least one display system 30 can include one or more processors (not shown), a transceiver (not shown), a memory (not shown), and a display 40. In one embodiment, the at least one display system 30 can be a computer. The display 40 can show a streaming graph 50 received from the at least one sensor device 20. The streaming graph 50 has edges and vertices. The edges and vertices of the streaming graph 50 can be outside a normal range and be an anomaly. The memory of the at least one display device can include programming for detecting anomalies in a streaming graph. This anomaly detection software can analyse the graph to find the outliers to: e.g., notify a user of the anomaly, change the state in a processor controlled device, turn on an air scrubber in a laboratory environment, or activate security measures, e.g., sound alarms, lock doors, summon security personnel or law enforcement, stream video offsite to a central security office, etc. The at least one display device with anomaly detection technology can be used in: e.g, medical setting, laboratory setting, plants or factories, school or universities, etc.

A novel anomaly detection framework is described, which learns vector representations for vertices and edges and detects graph deviations based on dynamic clustering algorithm. Additionally, an efficient algorithm for graph code learning based on neural network embedding is described. It can accurately and quickly encode the streaming graph objects. The graph codes learned can capture the clustering structure of the original graph, which is ideal for the clustering-based anomaly detection module. It is easier to maintain graph codes incrementally in streaming settings. For the new streaming edge(s), it only takes logarithmic time $O(\log(n))$ to generate new graph walks. Existing approaches are not applicable to the motivating scenario as they do not exhibit all of the desired properties simultaneously. The anomaly detection framework is faster: i) the number of graph walks is smaller; ii) the length of graph walks is shorter which leads to a small window size in vertex representation learning. For graphs which have high density, the possible accelerate strategy is to down sample the graph walks on the second order neighborhood structure of the vertices.

The notations used are summarized in Table 1.

TABLE 1

Notations Description

| Notation | Descriptions |
|---|---|
| G(E, V) | graph with a edge set E and a vertex set V |
| $E^{(t)}$ | streaming edge(s) at time-stamp t |
| $V^{(t)}$ | new vertex set at time-stamp t |
| n | number of vertices \|V\| |
| m | number of edges G(E, V) |
| l | graph walk length |
| d | latent dimension of vertex representation |
| D | latent dimension of edge representation, D = 2 × d |
| F | n × d feature matrix, also called graph codes |
| $F_i$ | d-dimensional representation of vertex $v_i$ |
| Ω | graph walk set of G(E, V) |
| Ω(v) | graph walk set start from vertex v |
| Γ | edge representation of graph G(E, V), ∈ m × D |
| $Γ_i$ | D-dimensional representation of edge $e_{uv}$ |
| W | encoding paramenter matrix ∈ $R^{n \times d}$ |
| W' | decoding parameter matrix ∈ $R^{d \times n}$ |

Given a graph G(E,V), the incoming stream of graph objects at time-stamp t are assumed an edge or small graph object denoted by an edge list $E^{(t)}$ where $|E^{(t)}| \geq 1$. The vertex set in the edge list $E^{(t)}$ at time-stamp t is denoted by $V^{(t)}$. The vertex set V is the union of the vertex sets across all time-stamps, that is $V = \cup \{V^{(t)}\}_{t=1}^{\infty}$. Similarly, $E = \cup \{E^{(t)}\}_{t=1}^{\infty}$. Note that the entire vertex set V is not known to us at time-stamp t, which means new vertices will be created at time-stamp t' for any t'>t. The graph at time-stamp t is denoted as $G^{(t)}$, which includes all edges and small graphs received from time-stamp 1 to t.

The goal is to detect anomalous vertices, edges and communities (group of vertices) at any given time t, i.e., in real time as $E^{(t)}$ occurs. To achieve this goal, the graph $G^{(t)}$ is encoded as a feature matrix, where the rows are vector representations of vertices. The main challenges are, i) the need to find a way to encode the graph streams, ii) the new graph objects can be easily coded by the learned graph codes, iii) the graph codes need to be updated accordingly as new graph objects received. A clustering-based approach is followed to detect the anomalies in graph streams. The clusters are built based on the learned feature matrix, and score an incoming or updated graph by measuring the distance between its code and the existing clusters. This clustering method needs to be updated efficiently as new graph objects received.

In order to detect the anomalies in graph streams in real time, the method can learn graph codes and perform online updates efficiently with new edges arriving in an infinite stream.

Analogous to using word embedding technique to construct the vector representations, the graph is decomposed into a set of graph walks which contain a list of vertices derived by breadth-first search. Graph walks is for a given vertex v∈V in graph G(E,V), its graph walks are defined as $\Omega(v) = \{(v,s,u)|(v,s) \in E \wedge (s,u) \in E\}$, which is a collection of two-hop walks start from vertex v. $\Omega = \{\Omega(v)\}_{v \in V}$ is called graph walks.

The graph walks are generated using breadth-first search over the entire vertex set of the graph and then considering only those walks whose length is three. Note that in Algorithm 1, there is no need to mark if a vertex has been visited before or not, since the walks are used to capture the local graph structures. For directed graph, the same search routines work essentially unmodified. The only difference is that when exploring a vertex v, it only looks at edges (v,s) going out of v; and ignores the other edges coming into v.

Algorithm 1 Graph Walks Generation

Input: G(E,V).
Output: Graph walk set Ω.
1. Set graph walk set Ω = Ø.
2. for each v ∈ V do
3. Set list S = Ø.
4. add s to S if (v,s) ∈ E.
5. for each s ∈ S do
6. add (v,s,u) to graph walk set Ω.
7. end
8. end Different from DeepWalk which uses random walks to learn vertex representation, the graph walks used are the graph walks derived by breadth-first search on graph G(E, V). The advantages of using graph walks can including the following:

The graph walks are unique in the given G(E,V). Therefore the learned graph codes are consistent and reproducible. Conversely, the random walks are unpredictable in DeepWalk.

The frequency which vertices appear in graph walks also show power-law distribution. This distribution is similar to the word frequency in natural language. It builds the connection between techniques from language modeling which account for this distributional behavior and vertex representation learning with graph walks.

The graph codes learned captures the clustering structure of the original graph, which is ideal for the clustering-based anomaly detection module.

It is easier to maintain graph codes incrementally in streaming settings. For the new streaming edge(s), it only takes logarithmic time $O(\log(n))$ to generate new graph walks. Existing approaches are not applicable to the motivating scenario as they do not exhibit all of the desired properties simultaneously.

This process is faster: i) the number of graph walks is smaller, ii) the length of graph walks is shorter which leads to a small window size in vertex representation learning. For graphs which have high density, the possible accelerate strategy is to down sample the graph walks on the second order neighborhood structure of the vertices.

Other features are also contemplated.

The reason graph walks are used instead of graph random walks is that the graph walks have the first-order proximity and second-order proximity information between the vertices. This is different from the language models. For example, Given the sentence Github is very important to programmers, a window size of 5 is needed to capture the relationship between "Github" and "programmers". However, in the graph walks. The "semantically" related vertices stay closer to each other, which can be determined through the observed tie strength and through the shared neighborhood structures of the vertices.

This connection to local and global network structure can motivate the use of a stream of graph walks as the basic tool for extracting information from a network. The Skip-gram architecture is then deployed, which has been originally developed to model natural language to learn vertex representations in graph.

The graph codes learning problem is formulated as a maximum likelihood optimization problem. The goal is to learn a mapping function $f: V \rightarrow R^d$ that each $v \in V$ can be represented as an d dimensional vector, where d is the latent dimension of vertex representation. This mapping function $f$ applies to any (un)directed, (un)weighted graph. The Skip-gram architecture is leveraged to learn the vector representation of vertices through a stream of graph walks. Skip-gram is similar to an auto-encoder, encoding each word in a vector, but training against the neighboring words in the input corpus. In the problem setting, the graph walks can be viewed as short sentences and the vertices are the words. The direct analog is to estimate the likelihood of observing vertex v given all the vertices in the graph walks.

Figure 3:
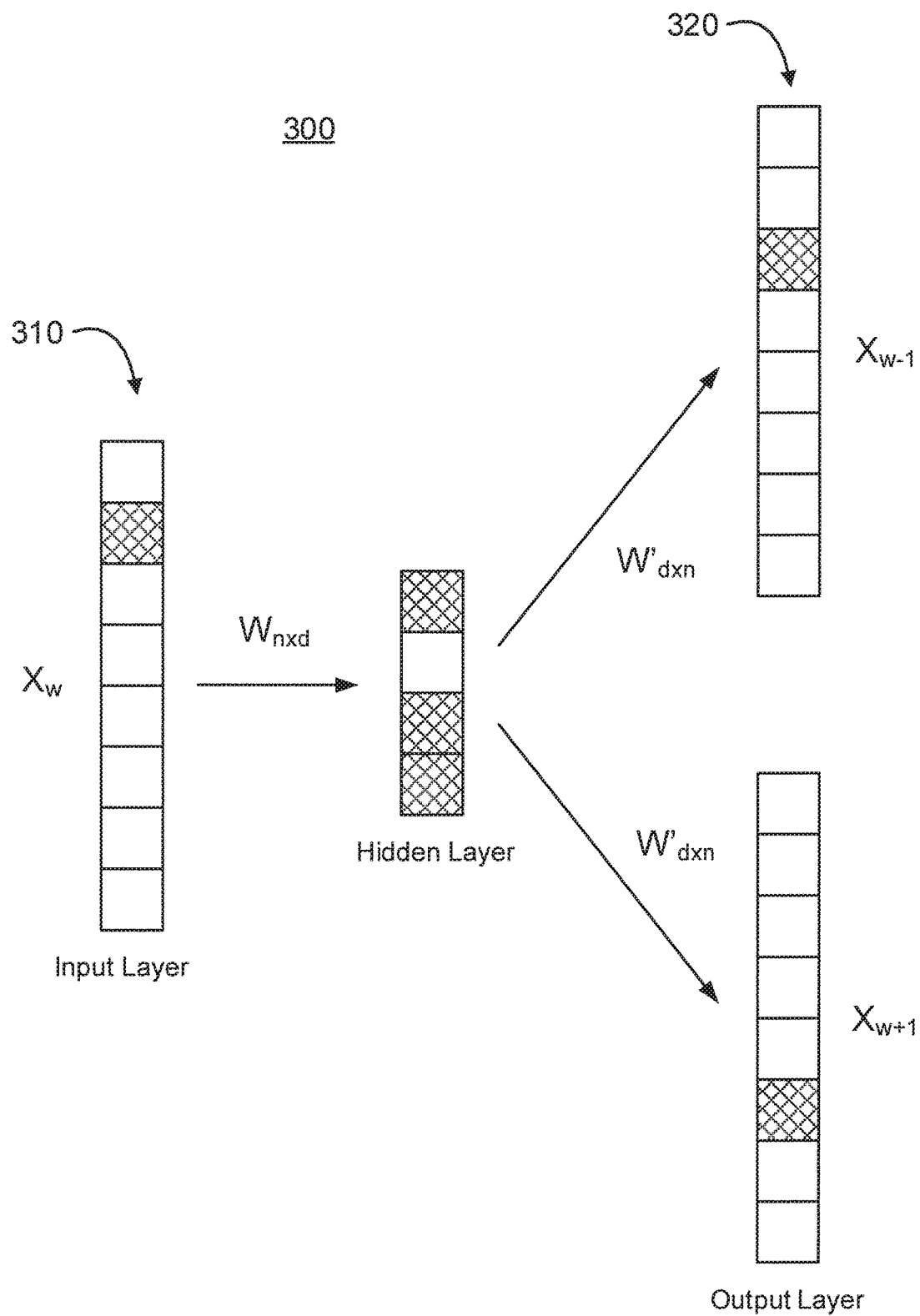
FIG. 3 is a block/flow diagram illustrating a skipgram model, in accordance with an embodiment of the present invention.

As an example, consider the graph walk u→s→v, the 'context' is defined as the window of vertices to the left and to the right of a target vertex. Here the window size of 1 is used, and then the (context, target) has pair ([u, v], s). According to skip-gram which tries to predict each context vertex from its target vertex. Thus the (input, output) dataset becomes (s,u) and (s,v). FIG. 3 shows the skipgram model 300 used in the vertex representation learning.

The inputs 310 and outputs 320 are one-hot encoded vectors, that is, for a given vertex input $x=\{x_1, x_2, \ldots, x_n\}$, only one out of n elements will be 1, and all others are 0. The goal is to learn a latent representation for each input vertex vector x. On the output layer of FIG. 3, the outputting C multinomial are distributions (C=2 in our problem setting). The conditional probability of each output is computed as:

$$p(w_{c,j} = w_{O,c} | w_I) = \frac{\exp(u_{c,j})}{\sum_{j'=1}^{n} \exp(u_{j'})} \quad (1)$$

where $w_{c,j}$ is the $j^{th}$ vertex in the vertex vocabulary on the $c^{th}$ context of the output layer; $w_{O,c}$ is the actual $c^{th}$ context vertex vector; $w_1$ is the input vertex; $u_{c,j}$ is the network feedforward result of the $j^{th}$ vertex on the $c^{th}$ context. Here $u_{c,j}=u_j=W_j' \cdot F$. The objective function is optimized which is defined over the entire dataset:

$$E = \log p(w_{O,1}, w_{O,2}, \ldots, w_{O,c} | w_I) = -\log \prod_{c=1}^{C} \frac{\exp(u_{c,j_c^*})}{\sum_{j'=1}^{n} \exp(u_{j'})} \quad (2)$$

where $u_{c,j_c}^*$ is the actual $c^{th}$ output context. For the update of Equation (2), in order to update, all vertices have to be iterated through in the graph for each training instance. The training computation is very expensive, and make it impractical to process large scale graphs. To solve this problem, hierarchical softmax or negative sampling can be used to limit the number of vectors that need to be updated per training instance.

The pseudocode for graph encoding given in Algorithm 2. Starting from every vertex∈V, all graph walks are generated via Algorithm 1. Then graph codes are learned by optimizing the aforementioned loss function.

| Algorithm 2 Graph Encoding |
|---|
| Input: G(E,V). |
| Output: Graph walk set Ω. |
| // initial graph codes learning |
| 1. Set graph walk set Ω = Ø. |
| 2. for each v ∈ V do |
| 3. Set list S = Ø. |
| 4. add s to S if (v,s) ∈ E. |
| 5. for each s ∈ S do |
| 6. add (v,s,u) to graph walk set Ω. |
| 7. end |
| 8. end |
| // streaming edges processing |
| // anomaly detection |

The algorithm learns vector representations for vertices in a graph. This allows it to detect vertex anomalies based on clustering algorithms. However, it is also interested in edge anomalies detection. Therefore, in order to make the decision on whether an incoming edge is an anomaly, it builds a lookup table to perform new edge(s) encoding in real-time based on the graph codes learned. Assume the graph codes learned by Algorithm 2 are $F \in R^{n \times d}$, each vertex $v_i$ is encoded as a d-dimension vector $F_i$. For each new edge $e_{uv}$ where u is the source vertex, and v is the destination vertex, it will be encoded as $[F_u, F_v]$. The edge list codes are denoted as $E \in R^{m \times D}$, where m is the number of edges, D=2×d. Euclidean distance is used to measure similarity between two edge codes.

Given two edges $e_i(u_i,v_i)$ and $e_j(u_j,v_j)$, the similarity between edges $e_i$, $e_j$ and the similarity between corresponding source vertices $u_i$, $u_j$ and destination vertices $v_i$, $v_j$ satisfy $sim(e_i,e_j)^2 = sim(u_i,u_j)^2 + sim(v_i,v_j)^2$.

Let $E_i$, $E_j$, $F_{ui}$, $F_{uj}$, $F_{vi}$, $F_{vj}$ be the codes of the aforementioned edges and vertices. Then the Euclidean distance between edges $e_i$ and $e_j$ can be calculated as:

$$sim(e_i, e_j)^2 = \|E_i - E_j\|^2 = \|[F_{ui}, F_{uj}] - [F_{vi}, F_{vj}]\|^2 =$$
$$\|F_{ui} - F_{vi}, F_{uj} - F_{vj}\|^2 = \|F_{ui} - F_{vi}\|^2 + \|F_{uj} - F_{vj}\|^2$$

which is equal to $sim(u_i,u_j) + sim(v_i,v_j)^2$.

The above shows that Euclidean similarity between two encoded edges is proportional to the similarity between corresponding source vertices and destination vertices. Thus the following is derived:

Given two edges $e_i(u,v_i)$ and $e_j(u,v_j)$ start from the same source vertex u. The edge similarity will increase if and only if the similarity of $v_i$ and $v_j$ increases.

Since the anomaly detection procedure is based on a clustering approach, it defines the way to encode edge over the vertex representations which has the property described above. The motivation behind this is that, if the vertices are from the same cluster, the edges between them are more likely to stay in the same cluster, and vice versa. Note that, the way to encode edges is very flexible. The process can add additional edge specific features to extend the current edge vectors. There are other edge encoding methods using the representations of individual vertex [ ]. These methods extend the vertex representations to pairs of vertices which represent edges.

The graph codes learned are dynamically maintained on the arrival of new edges in the stream. Each new edge brings a number of new graph walks which will be used to update the existing graph codes. For each new incoming edge (u,v), the stream graph walks are defined as $\Omega_s=\{(u,v,w)|(v,w)\in E, v\neq w\}\wedge\{(w,u,v)|(w,u)\in E, u\neq w\}$, which is a collection of graph walks containing the new incoming edge (u,v).

If the vertices in the incoming edge (u,v) are new. Then the vertex vocabulary needs updating by adding the new vertices. Then the model can be continued to be trained with new graph walks $\Omega_s$. The pseudocode of updating graph codes is listed below:

---
Algorithm 3 Graph Codes Updating
---
Input:
Output:
1. update vertex vocabulary
2. load the saved model
3. train the model with stream graph walks Ωs
4. update graph code matrix F
---

The graph codes of the streaming graph can be updated without maintaining the entire graph structure explicitly. For each new arriving edge (u,v), the new graph walks are generated by checking the start/end vertices of the original graph walks. If the graph walks are sorted, then the searching time is O(log(N)) where N is the total number of graph walks.

When the model is retrained with the new graph walks, the weights of the old vocabulary are used, and reset the weights of new vocabulary in the Skip-gram architecture.

The process is able to detect both edge and vertex anomalies. The anomaly detection problem in graph streams is defined as: given the vertex representations $F \in R^{n \times d}$ or edge representations $G \in R^{m \times D}$, the need to find a way to group them into k clusters of similar objects, and find the vertices or edges that do not naturally belong to any existing cluster. These data points are reported as anomalies.

The concept of clustering feature vector is extended to temporal setting. The temporal clustering feature vector is defined as given n d dimension data points $\{x_i\}_{i=1}^n$ with timestamps in a cluster C, the temporal clustering feature (TCF) vector of this cluster is defined as a triple: TCF=(n, c,$t_{max}$), where n is the total number of data points in the cluster, c is the centroid of this cluster, and $t_{max}$ is the latest timestamp of any point in this cluster.

Note that only TCF vector is stored as a summary of each cluster. This summary is very efficient and scalable because there is no need to store all data points. Furthermore, since the downstream task is to detect anomalies, there is no split or merge clusters, thus no need to store more measurements such as radius or diameter of clusters.

When new point(s) arrive, there is a need to find a way to update c and $t_{max}$. Assume that there are $n_0$ points $\{x_i\}_{i=1}^{n_0}$ in the existing cluster, and n' new points $\{x_i\}_{i=1}^{n'}$ at timestamp T' will be absorbed by this cluster. In the model, a decay factor δ is introduced when calculating the new centroid after absorbing new point(s). δ is a parameter to measure the importance of the "old" data points in the existing cluster. The centroid c then updated as follows:

$$c = \lambda_{old}\sum_{i=1}^{n_0} x_i + \lambda_{new}\sum_{i=1}^{n'} x_i' \quad (3)$$

$$= \lambda_{old} \times c_{old} \times n_0 + \lambda_{new}\sum_{i=1}^{n'} x_i' \quad (4)$$

where $$\lambda_{old} = \frac{1}{n_0+n'} \times \delta^{|T'-T_{max}|}, \lambda_{new} = \frac{1-\lambda_{old} \times n_0}{n'}.$$

After updating the centroid, $T_{max}$ in TCF is updated as max{T', $T_{max}$}. The new TCF will be $$TCF = \left(n_0+n', \lambda_{old}\sum_{i=1}^{n_0} x_i + \lambda_{new}\sum_{i=1}^{n'} x_i', \max\{T', T_{max}\}\right) \quad (5)$$

The new centroid c lays in the convex hull formed by all $n_0+n'$ data points.

The convex hull of a set of points S in d dimensions is the intersection of all convex sets containing S. For |S| points $x_1$, $x_2, \ldots$, the convex hull H is then given by the expression $$H = \left\{\sum_{j=1}^{|S|} \lambda_j x_j \,\middle|\, (\forall j:\lambda_j \geq 0) \wedge \sum_{j=1}^{|S|} \lambda_j = 1\right\} \quad (6)$$

And the problem setting, $$\sum_{j=1}^{N} \lambda_j = n_0 * \lambda_{old} + n' * \lambda_{new} = 1, \lambda_{old} \geq 0, \lambda_{new} \geq 0 \quad (7)$$

Thus the new centroid $c=\lambda_{old}\Sigma i=1^{n_0} x_i+\lambda$new $\Sigma_{i=1}^{n'} x_i'$ in the convex hull formed by all points in the new cluster.

Figure 4:
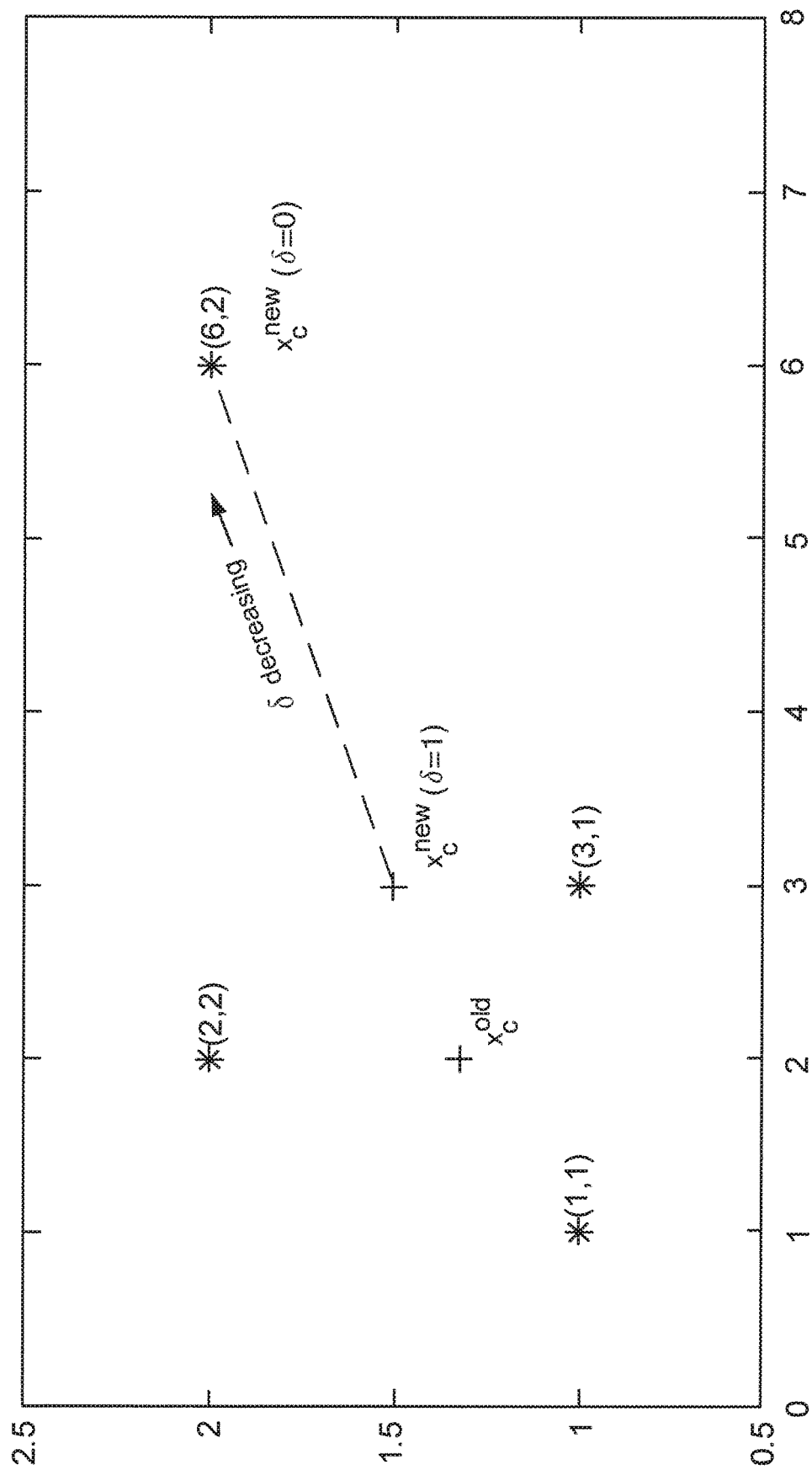
FIG. 4 is illustrating different values of a new centroid after introducing a decay factor, in accordance with an embodiment of the present invention.

FIG. 4 depicts the different values of new centroid $x_c^{new}$ after introducing decay factor δ. Assume the original cluster contains three points (1,1), (2,2) and (3,1). Point (6,2) is the new arriving one. $x_c^{old}$ is calculated based on the original cluster. If there is no decay factor (δ=1), then the updated centroid is the calculated by averaging all these four points. However, if the decay factor δ introduced, the centroid will move to the new point (6,2) as δ decreasing. In this case, more weight is assigned on the new arrival points.

The process maintains a collection of data statistics in the clustering stage so that it can be effectively used in the streaming setting. Initially, the training data points collected from the initial graph are grouped into k clusters using k-means algorithms. The TCF vectors are calculated for each cluster.

When new points (vertices or edges) at timestamp T arrive, the closest cluster to each point $x_i'$ is found. The similarity measure used is a Euclidean distance which is given by $D=\|c-x_i'\|_2$. In many cases, the point $x_i$ does not naturally belong to any existing cluster. For example:

$x_i'$ corresponds to an anomaly.

$x_i'$ is the beginning of a new cluster in the data stream.

It's hard to distinguish the above cases until more data points are received. So in the model, an anomaly threshold a is defined. If the distance D is larger than a, a new cluster for the point $x_i'$ is created, and the corresponding TCF equals $(1,x_i',T)$. If the data point falls with the anomaly threshold, it will be added to the closest cluster and all entries in TCF of this cluster will be updated using Eq. (5). The anomaly score of each point is reported as the closest distance to the centroids of existing clusters.

With k clusters described by k TCF vectors, finding the nearest cluster takes O(kd) time. And it also takes O(d) time to compute the anomaly score for each data point. Updating the TCF vector takes O(d+2) time with respect to the dimension of the TCF vector. Thus the total time complexity in anomaly detection part is O(kd) for each incoming data point. The only thing needs to be keep in the memory in the TCF vectors, leading to a total space complexity of O(kd) for clustering and anomaly detection.

Figure 5:
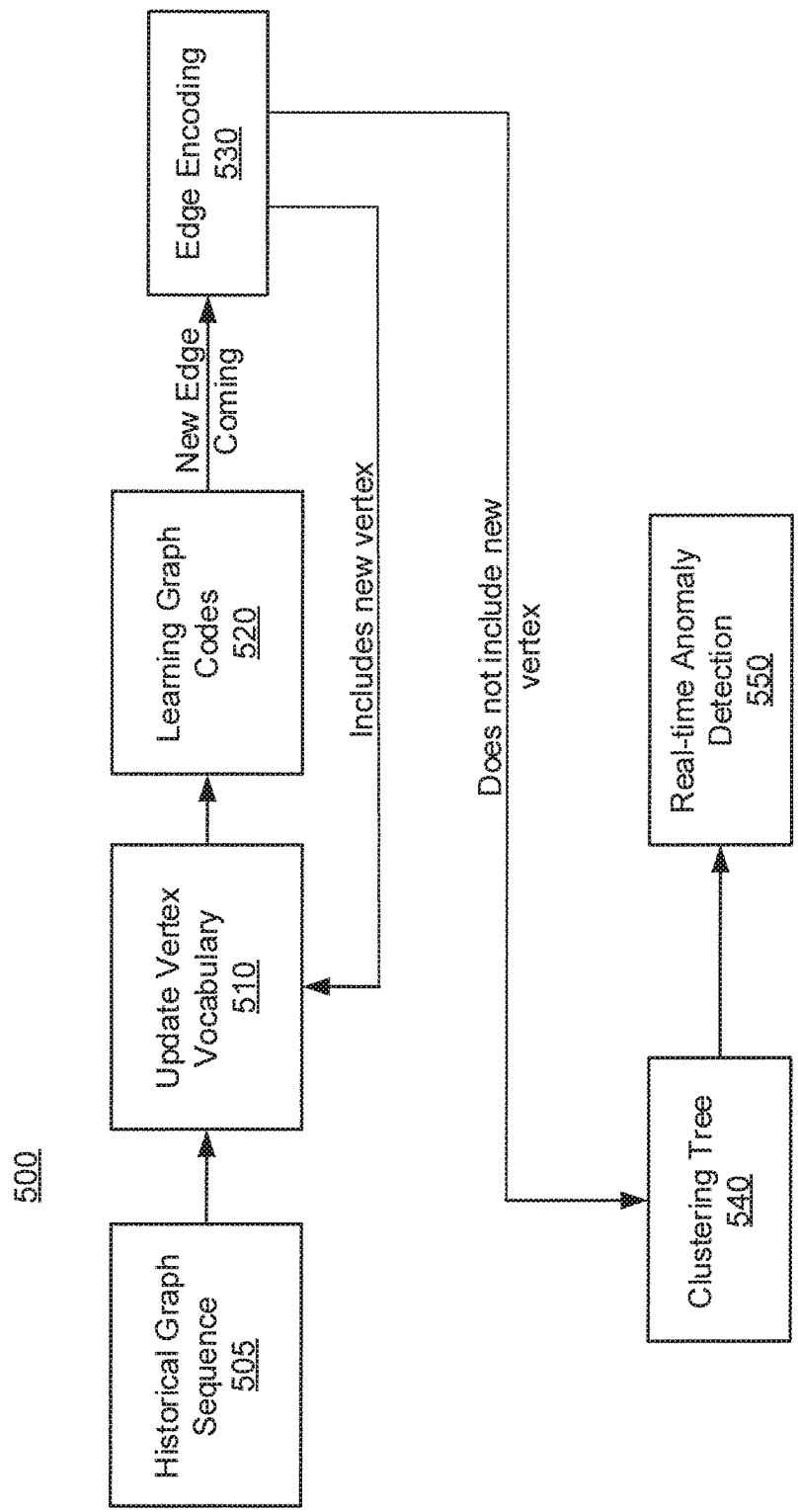
FIG. 5 shows a block/flow diagram illustrating a real-time anomaly detection method in streaming networks, in accordance with an embodiment of the present invention.

FIG. 5 shows a block/flow diagram illustrating a real-time anomaly detection method 500 in streaming networks, in accordance with an embodiment of the present invention. The real-time anomaly detection method 500 in streaming networks can have a historical graph sequence in block 505. Block 505 can feed in to block 510 that updates a vertex vocabulary. Block 510 can build a vertex vocabulary by indexing with incremental order. Block 510 can use both the historical graph sequence from block 505 and new vertex from block 530. Block 510 can feed into block 520 to learn graph codes.

Block 520 can learn graph codes by transforming vertex to vectors using a Skip-gram model. The graph codes learning problem is formulated as a maximum likelihood optimization problem. For scalability issues, hierarchical softmax or negative sampling is employed to limit the number of vectors that need to be updated per training instance. New edges come out of block 520 and can feed into block 530 to encode edges.

Block 530 builds a lookup table to perform new edge(s) encoding in real-time based on the learned graph codes. Assume the graph codes learned Skip-gram algorithm is F, each vertex $v_i$ is encoded as a d-dimension vector F. For each new edge $e_{uv}$ where u is the source vertex, and v is the destination vertex, it will be encoded as $[F_u, F_v]$. The edge list codes are denoted as E, where m is the number of edges. Euclidean distance is employed to measure similarity between two edge codes. New and not new vertex can come out of block 530. The new vertex can feed back into block 510. The not new vertex can feed into a clustering tree in block 540.

Block 540 can employ the temporal clustering feature (TCF) vector, which is a triple to profile each. A collection of data statistics can be maintained in the clustering stage so that it can be effectively used in the streaming setting. Initially, the training data points collected from the initial graph are grouped into k clusters using k-means algorithms. The TCF vectors are calculated for each cluster. Block 540 can feed into block 550 for real-time anomaly detection.

Block 550 detects an anomaly if the new vertex or edges are far from all current clustering centers.

Figure 6:
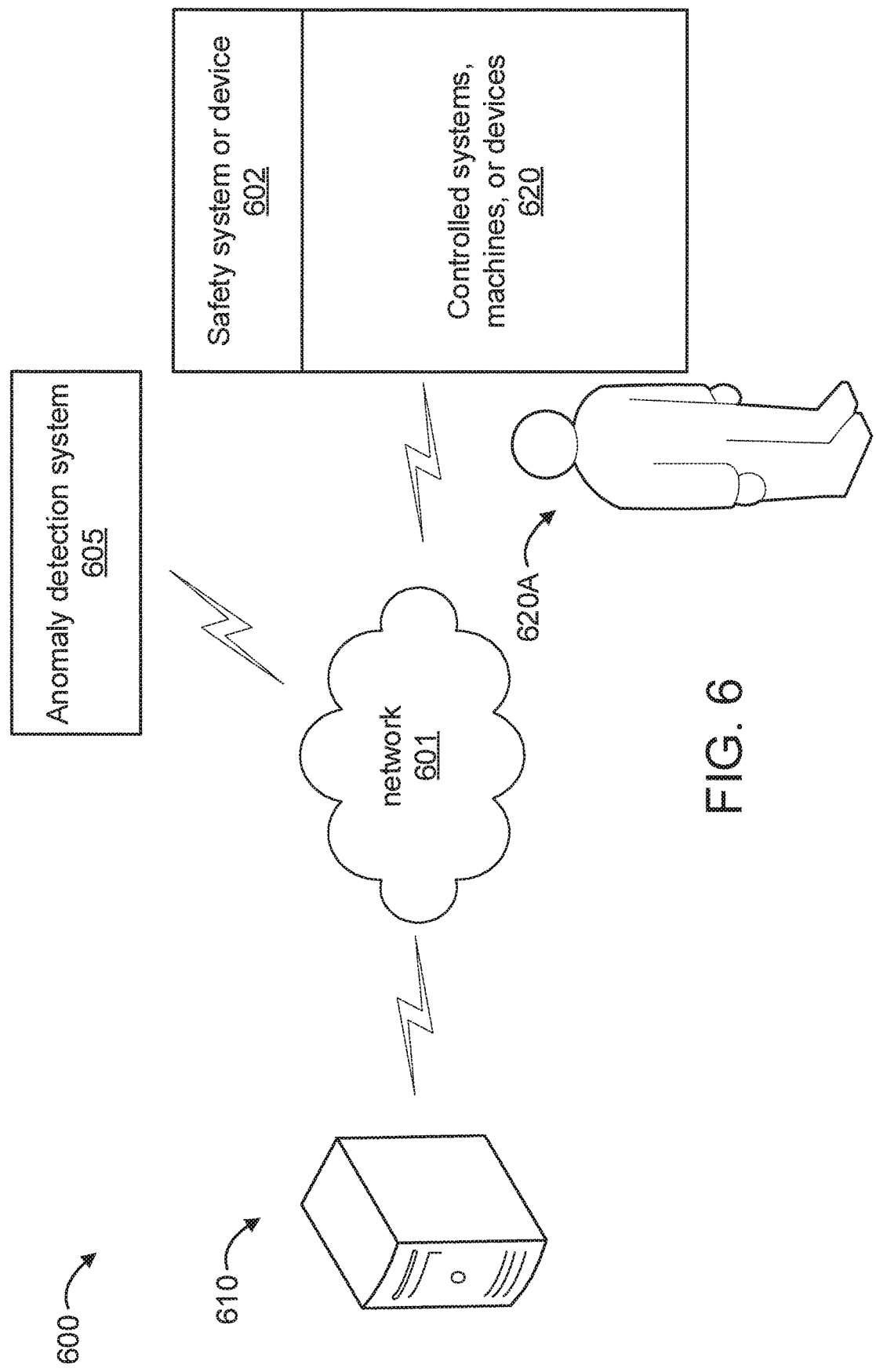
FIG. 6 shows a block diagram of an exemplary environment to which the present invention can be applied, in accordance with an embodiment of the present invention.

FIG. 6 shows a block diagram of an exemplary environment 600 to which the present invention can be applied, in accordance with an embodiment of the present invention. The environment 600 is representative of a computer network to which the present invention can be applied. The elements shown relative to FIG. 6 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 600 at least includes at least one safety system or device 602, at least one fault detection system 605, at least one computer processing system 610, at least one controlled system(s), machine(s), and/or device(s) (individually and collectively denoted by the reference numeral 620 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 610 can be any type of computer processing system including, but not limited to, servers, desktops, laptops, tablets, smart phones, media playback devices, and so forth, depending upon the particular implementation. For the sake of illustration, the computer processing system 610 is a server.

The at least one anomaly detection system 605 is configured to detect one or more anomalies. The computer processing system 610 is configured to perform anomaly detection on streaming networks. Moreover, the computer processing system 610 is configured to initiate an action (e.g., a control action) on the controlled system, machine, and/or device 620 responsive to the detected anomaly. Such action can include, but is not limited to, one or more of: powering down the controlled system, machine, and/or device 620 or a portion thereof; powering down, e.g., a system, machine, and/or a device that is affected by an anomaly in another device, stopping a centrifuge being operated by a user 620A before an imbalance in the centrifuge causes a critical failure and harm to the user 620A, opening a valve to relieve excessive pressure (depending upon the anomaly), locking an automatic fire door, and so forth. As is evident to one of ordinary skill in the art, the action taken is dependent upon the type of anomaly and the controlled system, machine, and/or device 620 to which the action is applied.

The safety system or device 602 can implement the aforementioned or other action. The safety system or device 602 can be a shut off switch, a fire suppression system, an overpressure valve, and so forth. As is readily appreciated by one of ordinary skill in the art, the particular safety system or device 602 used depends upon the particular implementation to which the present invention is applied. Hence, the safety system 602 can be located within or proximate to or remote from the controlled system, machine, and/or device 620, depending upon the particular implementation.

In the embodiment shown in FIG. 6, the elements thereof are interconnected by a network(s) 601. However, in other embodiments, other types of connections (e.g., wired, etc.) can also be used. Additionally, one or more elements in FIG. 6 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 700 are readily determined by one of ordinary skill in the art, given the teachings of the present invention provided herein, while maintaining the spirit of the present invention.

Figure 7:
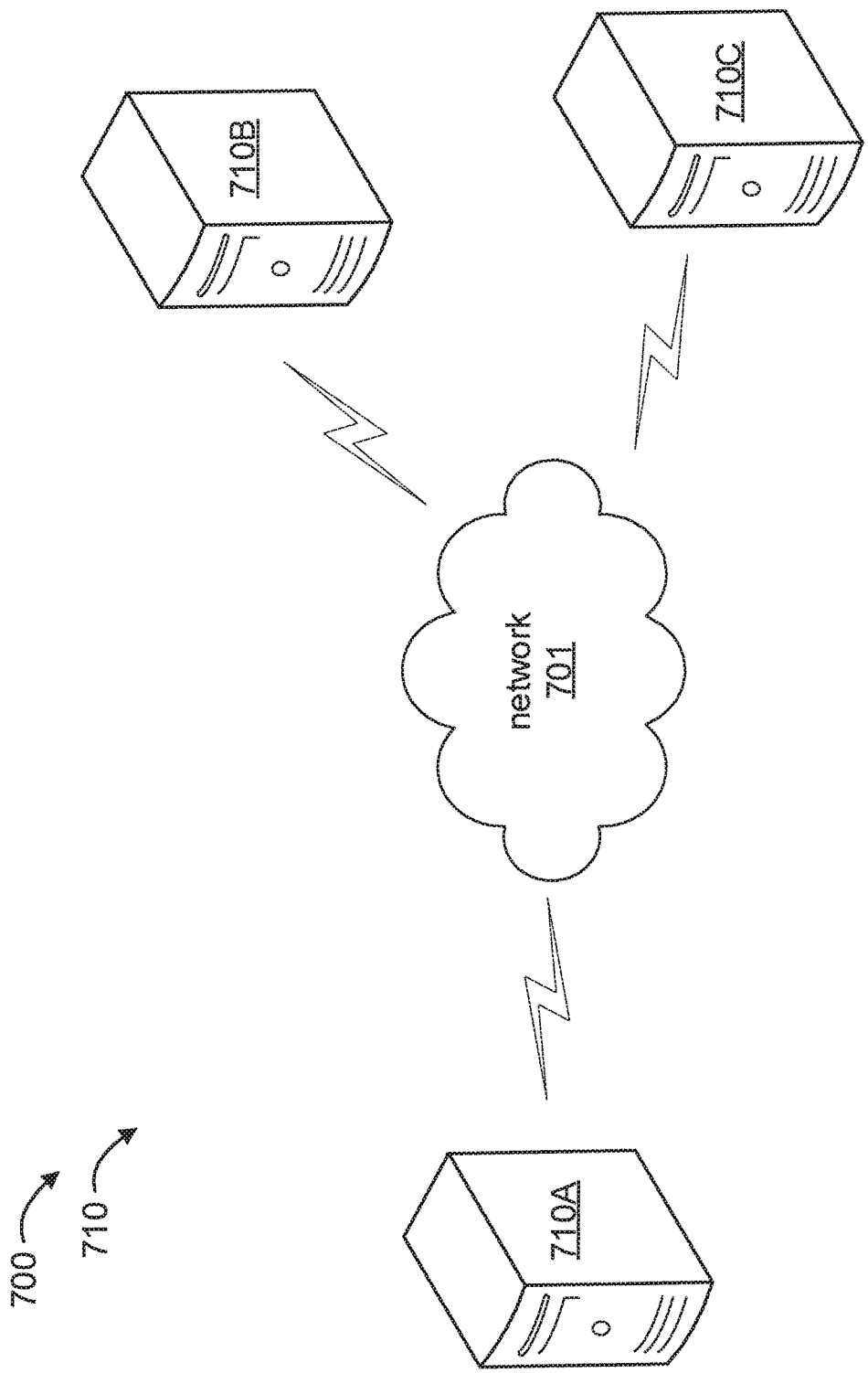
FIG. 7 shows a block diagram of an exemplary environment to which the present invention can be applied, in accordance with an embodiment of the present invention.

FIG. 7 shows an exemplary environment 700 to which the present invention can be applied, in accordance with an embodiment of the present invention. The environment 700 is representative of a computer network to which the present invention can be applied. The elements shown relative to FIG. 7 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 700 at least includes a set of computer processing systems 710. The computer processing systems 710 can be any type of computer processing system including, but not limited to, servers, desktops, laptops, tablets, smart phones, media playback devices, and so forth. For the sake of illustration, the computer processing systems 710 include server 710A, server 710B, and server 710C.

In an embodiment, the present invention performs system fault diagnosis via efficient temporal and dynamic historical fingerprint retrieval on the computer processing systems 710. Thus, any of the computer processing systems 710 can perform system fault diagnosis via efficient temporal and dynamic historical fingerprint retrieval that produce a fault event, or accessed by, any of the computer processing systems 710. Moreover, the output (including corrective actions) of the present invention can be used to control other systems and/or devices and/or operations and/or so forth, as readily appreciated by one of ordinary skill in the art given the teachings of the present invention provided herein, while maintaining the spirit of the present invention.

In the embodiment shown in FIG. 7, the elements thereof are interconnected by a network(s) 701. However, in other embodiments, other types of connections can also be used. Additionally, one or more elements in FIG. 7 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 700 are readily determined by one of ordinary skill in the art, given the teachings of the present invention provided herein, while maintaining the spirit of the present invention.

Figure 8:
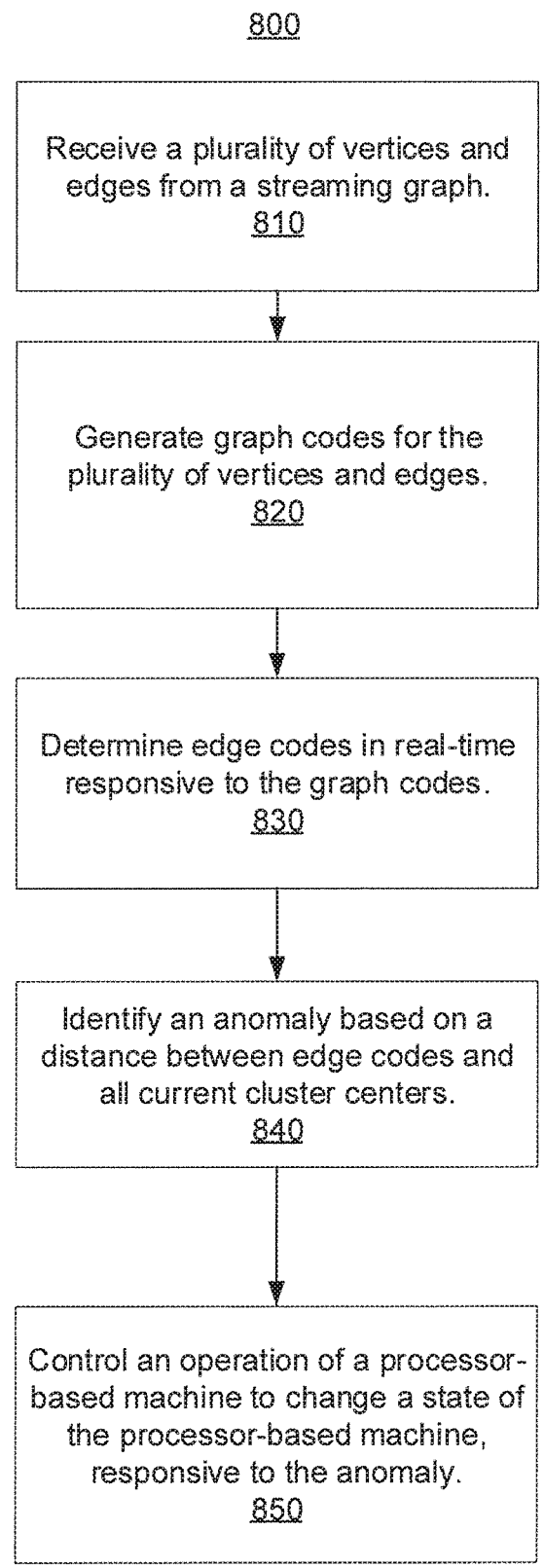
FIG. 8 is a block diagram illustrating a method for anomaly detection in a streaming network, in accordance with an embodiment of the present invention.

Referring now to FIG. 8, a block diagram illustrating a method for anomaly detection in a streaming network, in accordance with an embodiment of the present invention. In block 810, receive a plurality of vertices and edges from a streaming graph. In block 820, generate graph codes for the plurality of vertices and edges. In block 830, determine edge codes in real-time responsive to the graph codes. In block 840, identify an anomaly based on a distance between edge codes and all current cluster centers. In block 850, control an operation of a processor-based machine to change a state of the processor-based machine, responsive to the anomaly.

Figure 9:
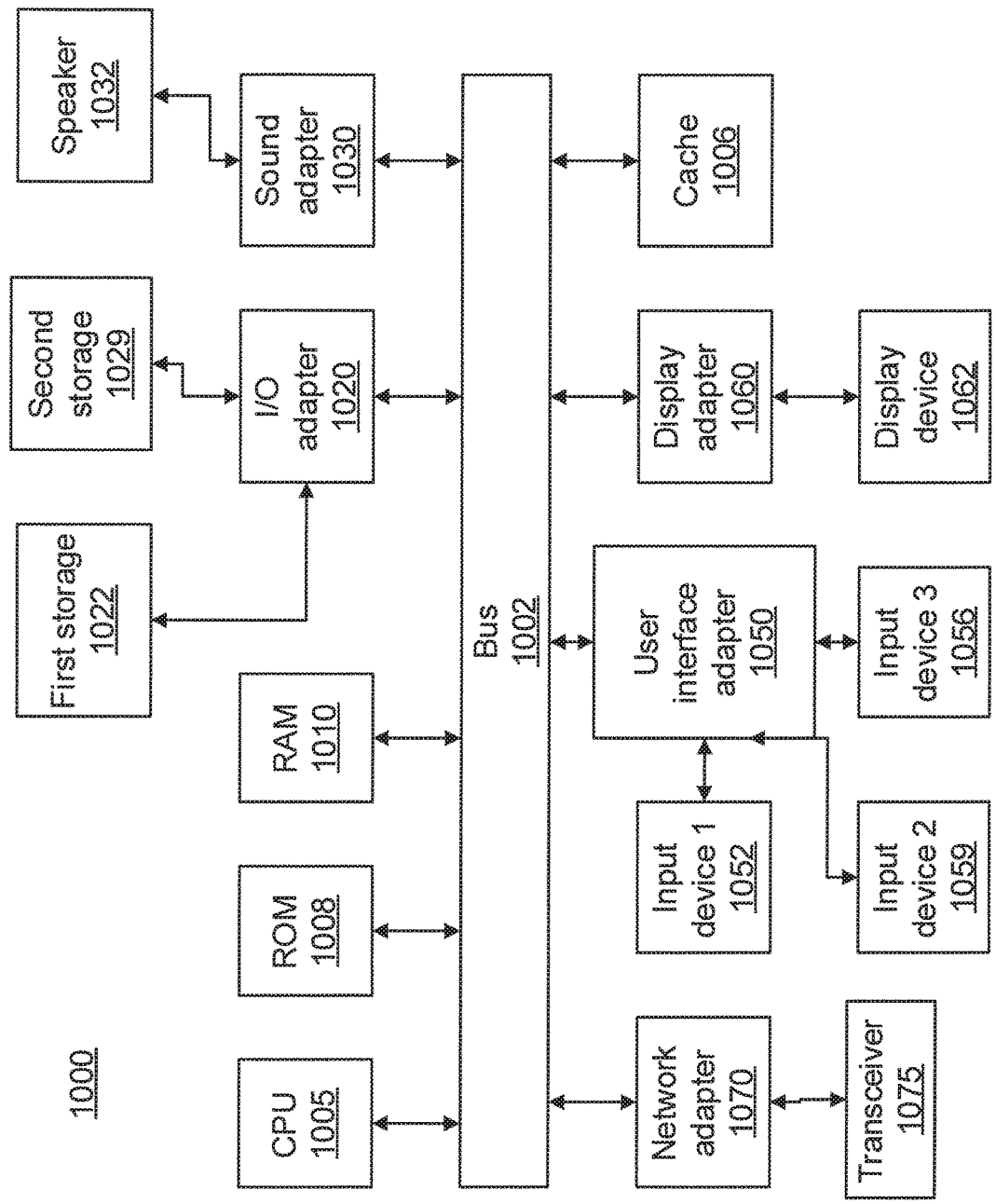
FIG. 9 shows a block diagram of a computer processing system, to be used to reconfigure the ROSS or for control purposes, in accordance with an embodiment of the present invention.

Referring now to FIG. 9, a block diagram of a computer processing system 1000, to be used to reconfigure the ROSS or for control purposes, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

A first storage device 1022 and a second storage device 1029 are operatively coupled to system bus 1002 by the I/O adapter 1020. The storage devices 1022 and 1029 can be any of a disk storage device (e.g., a magnetic or optical disk storage device), a solid state magnetic device, and so forth. The storage devices 1022 and 1029 can be the same type of storage device or different types of storage devices.

A speaker 1032 may be operatively coupled to system bus 1002 by the sound adapter 1030. The speaker 1032 can sound an alarm when controlled. A transceiver 1075 is operatively coupled to system bus 1002 by network adapter 1070. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in the present invention. The user input devices 1052, 1059, and 1056 can be the same type of user input device or different types of user input devices. The user input devices 1052, 1059, and 1056 are used to input and output information to and from system 1000.

Of course, the computer system 1000 may also include other elements (not shown), as readily contemplated by one of skill in the art, as well as omit certain elements. For example, the devices described in FIGS. 2, 3, 5, 7, and 8 can be controlled by computer system 1000. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, it is to be appreciated that network 600 and network 700 described above with respect to FIG. 6 and FIG. 7 are networks for implementing respective embodiments of the present invention. Part or all of computer processing system 1000 may be implemented in one or more of the elements of network 600 and/or one or more of the elements of network 700.

Further, it is to be appreciated that computer processing system 1000 may perform at least part of the method described herein including, for example, at least part of method 800 of FIG. 8.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of anomaly detection in streaming networks, with the details and particularity required by the patent laws, what is claimed and desired protected by Letters Patent is set forth in the appended claims.

What is claimed is:

1. A computer-implemented method for anomaly detection in streaming networks, the method comprising:
   receiving, by a processor, a plurality of vertices and edges from a streaming graph;
   generating, by the processor, graph codes for the plurality of vertices and edges;
   determining, by the processor, edge codes in real-time responsive to the graph codes;
   identifying, by the processor, an anomaly based on a closest cluster distance between edge codes and all current cluster centers;
   updating a centroid of a particular cluster C using a temporal clustering feature (TCF) vector defined as a triple, TCF=(n, c, $t_{max}$) by:

$$c = \lambda_{old} \sum_{i=1}^{n_0} x_i + \lambda\text{new} \sum_{i=1}^{n'} x_i'$$

where n is a total number of data points in the cluster C, c represents the centroid of the cluster C, $t_{max}$ represents a latest timestamp of any point in the cluster C, n' represents a number of new points in the cluster C, $x_i$ represents a current vertex input, and $x_i'$ represents a new vertex input; and
   controlling an operation of a processor-based machine to change a state of the processor-based machine, responsive to the anomaly.

2. The computer-implemented method as recited in claim 1, wherein the generating step transforms the plurality of vertices and edges into vectors utilizing a skip-gram model.

3. The computer-implemented method as recited in claim 1, wherein the controlling step turns on an air scrubber in a laboratory environment.

4. The computer-implemented method as recited in claim 1, wherein the generating step limits a number of vectors employed in generating the graph codes by utilizing a hierarchical softmax or a negative sampling.

5. The computer-implemented method as recited in claim 1, wherein the controlling step activates security measures.

6. The computer-implemented method as recited in claim 1, wherein the determining step builds a look-up table for determining the edge codes in real-time.

7. The computer-implemented method as recited in claim 1, wherein the identifying step includes forming cluster centers of existing edge codes.

8. The computer-implemented method as recited in claim 7, wherein the forming step includes a temporal clustering feature vector.

9. The computer-implemented method as recited in claim 1, wherein the identifying step identifies the anomaly when the distance is greater than a threshold distance.

10. The computer-implemented method as recited in claim 1, wherein the identifying step adds the anomaly to a cluster center closest to the anomaly.

11. A computer program product for anomaly detection in streaming networks, the computer program product comprising a non-transitory computer readable storage medium having program instructions embodied therewith, the program instructions executable by a computer to cause the computer to perform a method comprising:
   receiving, by a processor, a plurality of vertices and edges from a streaming graph;
   generating, by the processor, graph codes for the plurality of vertices and edges;

determining, by the processor, edge codes in real-time responsive to the graph codes;

identifying, by the processor, an anomaly based on a closest cluster distance between edge codes and all current cluster centers;

updating a centroid of a particular cluster C using a temporal clustering feature (TCF) vector defined as a triple, TCF=(n, c, $t_{max}$) by:

$$c = \lambda_{old}\sum_{i=1}^{n_0} x_i + \lambda \text{new} \sum_{i=1}^{n'} x'_i$$

where n is a total number of data points in the cluster C, c represents the centroid of the cluster C, $t_{max}$ represents a latest timestamp of any point in the cluster C, n' represents a number of new points in the cluster C, $x_i$ represents a current vertex input, and $x_i'$ represents a new vertex input; and controlling an operation of a processor-based machine to change a state of the processor-based machine, responsive to the anomaly.

12. An anomaly detection system for streaming networks, the anomaly detection system comprising:

a processing system including a processor and memory coupled to the processor, the processing system programmed to:

receive a plurality of vertices and edges from a streaming graph;

generate graph codes for the plurality of vertices and edges;

determine edge codes in real-time responsive to the graph codes;

identify an anomaly based on a closest cluster distance between edge codes and all current cluster centers;

update a centroid of a particular cluster C using a temporal clustering feature (TCF) vector defined as a triple, TCF=(n, c, $t_{max}$) by:

$$c = \lambda_{old}\sum_{i=1}^{n_0} x_i + \lambda \text{new} \sum_{i=1}^{n'} x'_i$$

where n is a total number of data points in the cluster C, c represents the centroid of the cluster C, $t_{max}$ represents a latest timestamp of any point in the cluster C, n' represents a number of new points in the cluster C, $x_i$ represents a current vertex input, and $x_i'$ represents a new vertex input; and control an operation of a processor-based machine to change a state of the processor-based machine, responsive to the anomaly.

13. The anomaly detection system as recited in claim 12, wherein the processing system is further programmed to employ a skip-gram model.

14. The anomaly detection system as recited in claim 13, wherein the skip-gram model transforms the plurality of vertices and edges into vectors.

15. The anomaly detection system as recited in claim 12, wherein the processing system is further programmed to employ a hierarchical softmax or a negative sampling.

16. The anomaly detection system as recited in claim 15, wherein the hierarchical softmax or the negative sampling limit a number of vectors employed in generating the graph codes.

17. The anomaly detection system as recited in claim 12, wherein the processing system is further programmed to build a look-up table for determining the edge codes in real-time.

18. The anomaly detection system as recited in claim 12, wherein the processing system is further programmed to form cluster centers of existing edge codes.

19. The anomaly detection system as recited in claim 18, wherein the processing system is further programmed to employ a temporal clustering feature vector.

20. The anomaly detection system as recited in claim 12, wherein the processing system is further programmed to identify the anomaly when the distance is greater than a threshold distance.

* * * * *